United States Patent
Kasuya et al.

(10) Patent No.: US 12,374,066 B2
(45) Date of Patent: Jul. 29, 2025

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventors: Nozomu Kasuya, Kanagawa (JP); Atsushi Date, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 18/158,485

(22) Filed: Jan. 24, 2023

(65) Prior Publication Data

US 2023/0245411 A1    Aug. 3, 2023

(30) Foreign Application Priority Data

Jan. 31, 2022    (JP) ................. 2022-013581

(51) Int. Cl.
*G06T 19/20* (2011.01)
*G06T 7/20* (2017.01)
(Continued)

(52) U.S. Cl.
CPC .............. *G06T 19/20* (2013.01); *G06T 7/20* (2013.01); *G06T 7/70* (2017.01); *G06T 7/90* (2017.01);
(Continued)

(58) Field of Classification Search
CPC .. G06T 19/20; G06T 7/20; G06T 7/70; G06T 7/90; G06T 2207/10024; G06T 2219/2012;
(Continued)

(56) References Cited

U.S. PATENT DOCUMENTS 10,939,081 B2    3/2021    Miyatani et al.
11,003,939 B2    5/2021    Kotake et al.
(Continued)

FOREIGN PATENT DOCUMENTS

EP    3550522 A1 * 10/2019 ............. G06T 15/20
EP    4050567 A1 *  8/2022 ............. G06T 15/04
(Continued)

OTHER PUBLICATIONS

Matusik, W. et al., "Polyhedral Visual Hulls for Real-Time Rendering" Proceedings of Eurographics Workshop on Rendering (Jun. 2001) pp. 115-125.
(Continued)

*Primary Examiner* — Frank S Chen
(74) *Attorney, Agent, or Firm* — Carter, DeLuca & Farrell LLP

(57) ABSTRACT

An information processing apparatus is provided. A determination method for determining a color of an object in a virtual viewpoint video, which includes the object and is generated based on a captured image obtained by capturing an image of the object, is selected based on a movement of a virtual viewpoint corresponding to the virtual viewpoint video or a movement of the object. The virtual viewpoint video, which includes the object, is generated through determining the color of the object in the virtual viewpoint video with the selected determination method.

18 Claims, 6 Drawing Sheets

(51) Int. Cl.
*G06T 7/70* (2017.01)
*G06T 7/90* (2017.01)

(52) U.S. Cl.
CPC ............... *G06T 2207/10024* (2013.01); *G06T 2219/2012* (2013.01); *G06T 2219/2021* (2013.01)

(58) Field of Classification Search
CPC . G06T 2219/2021; G06T 15/20; G06T 15/04; H04N 21/21805; H04N 21/816; H04N 21/854
See application file for complete search history.

(56) References Cited

U.S. PATENT DOCUMENTS

| 11,144,786 | B2 | 10/2021 | Tomioka et al. | |
|---|---|---|---|---|
| 2019/0213778 | A1* | 7/2019 | Du | G06T 15/04 |
| 2021/0232845 | A1 | 7/2021 | Kotake et al. | |

FOREIGN PATENT DOCUMENTS

| JP | 2018-092580 A | 6/2018 |
|---|---|---|
| WO | 2021/079592 A1 | 4/2021 |

OTHER PUBLICATIONS

Carranza, J. et al., "Free-Viewpoint Video of Human Actors" ACM SIGGRAPH 2003 Papers (Jul. 2003) pp. 569-577.
Matusik, W. et al., "Polyhedral Visual Hulls for Real-Time Rendering" Rendering Techniques 2001: Proceedings of Eurographics Workshop on Rendering (Jun. 2001) pp. 115-125.
Lee, C.C. et al., "Free viewpoint video (FVV) survey and future research direction" APSIPA Transactions on Signal and Information Processing (Oct. 2015) pp. 1-10, vol. 4.
Extended European Search Report issued in EP Patent Application No. 23152613.8, dated Jun. 6, 2023, pp. 1-10.
Notice of Reasons for Refusal issued by the Japanese Patent Office on Nov. 17, 2023 in corresponding JP Patent Application No. 2022-013581, with English translation.

* cited by examiner

INFORMATION PROCESSING APPARATUS, INFORMATION PROCESSING METHOD, AND MEDIUM

BACKGROUND

Field

The present disclosure relates to an information processing apparatus, an information processing method, and a medium, in particular to a technique for generating a virtual viewpoint video.

Description of the Related Art

A technique for generating a virtual viewpoint video using a plurality of images, which have been obtained by placing a plurality of image capturing apparatuses at different positions and then performing synchronous image capturing, has been attracting attention. For example, images captured by a plurality of image capturing apparatuses are aggregated in an information processing apparatus, such as a server, and a virtual viewpoint video is generated by an image processing apparatus performing processing, such as three-dimensional model generation and rendering. The generated virtual viewpoint video can be transmitted to a user terminal for viewing.

Such a virtual viewpoint video can be generated as a virtual video when an image capturing space is reconstructed based on a group of captured images and that image capturing space is captured with a virtual camera. In Matusik (W. Matusik et al. "Polyhedral Visual Hulls for Real-Time Rendering", Proceedings of Eurographics Workshop on Rendering 2001, pp. 115-125, 2001), in order to perform coloring for a virtual viewpoint video to realize generation of a high-definition virtual viewpoint video, an image captured by an image capturing apparatus that is close to a virtual viewpoint is projected onto the virtual viewpoint video.

SUMMARY

According to an embodiment, an information processing apparatus comprises one or more processors and one or more memories storing one or more programs which cause the one or more processors to: select a determination method for determining a color of an object in a virtual viewpoint video, which includes the object and is generated based on a captured image obtained by capturing an image of the object, based on a movement of a virtual viewpoint corresponding to the virtual viewpoint video or a movement of the object; and generate the virtual viewpoint video, which includes the object, through determining the color of the object in the virtual viewpoint video with the selected determination method.

According to another embodiment, an information processing method comprises: selecting a determination method for determining a color of an object in a virtual viewpoint video, which includes the object and is generated based on a captured image obtained by capturing an image of the object, based on a movement of a virtual viewpoint corresponding to the virtual viewpoint video or a movement of the object; and generating the virtual viewpoint video, which includes the object, through determining the color of the object in the virtual viewpoint video with the selected determination method.

According to still another embodiment, a non-transitory computer-readable medium stores a program executable by a computer to perform a method comprising: selecting a determination method for determining a color of an object in a virtual viewpoint video, which includes the object and is generated based on a captured image obtained by capturing an image of the object, based on a movement of a virtual viewpoint corresponding to the virtual viewpoint video or a movement of the object; and generating the virtual viewpoint video, which includes the object, through determining the color of the object in the virtual viewpoint video with the selected determination method.

Further features of the present disclosure will become apparent from the following description of exemplary embodiments (with reference to the attached drawings).

DESCRIPTION OF THE EMBODIMENTS

Figure 1:
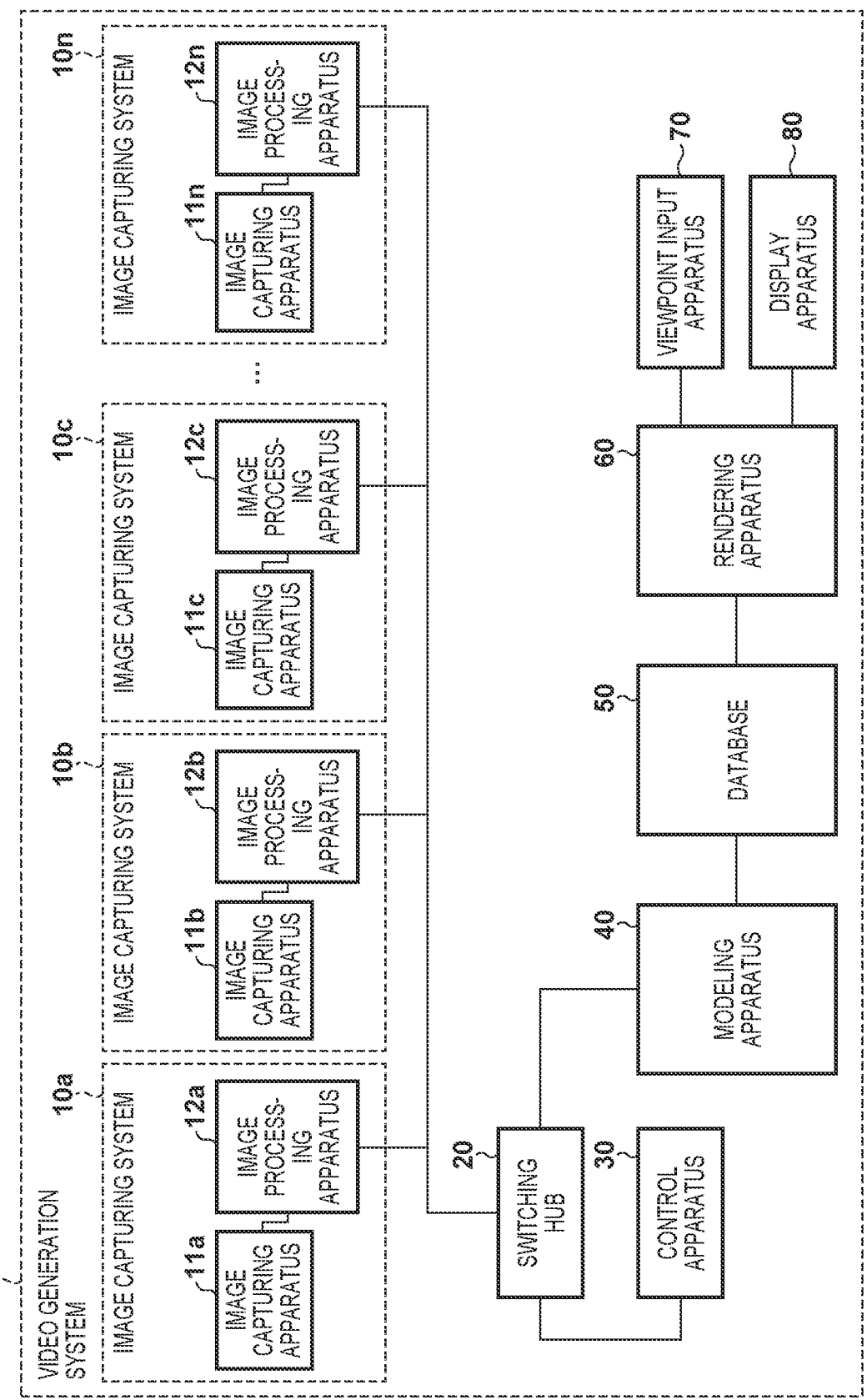
FIG. 1 is a diagram illustrating an example of a schematic configuration of a video generation system according to an embodiment.

Hereinafter, embodiments will be described in detail with reference to the attached drawings. Note, the following embodiments are not intended to limit the scope of the claims. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

In a virtual viewpoint video, a virtual viewpoint may move. In the method described in Matusik, when the image capturing apparatus that is closest to a virtual viewpoint switches in such a case, there is a possibility that a rapid change may occur in a texture of an object in a virtual viewpoint video, thereby making the switch noticeable.

The present disclosure provides a technique for generating a virtual viewpoint image for which a sense of unnaturalness that a user may experience has been reduced.

An information processing apparatus according to an embodiment of the present disclosure generates a virtual viewpoint video, which includes an object, for when the object is viewed from a virtual viewpoint based on a captured image obtained by capturing an image of an object from a plurality of positions. First, a description will be given for a system which includes such an information processing apparatus and is for generating a virtual viewpoint video.

FIG. 1 illustrates an example of an overall configuration of a virtual viewpoint video generation system according to an embodiment. A video generation system 1 includes image capturing systems 10a to 10n, a switching hub 20, a control apparatus 30, a modeling apparatus 40, a database 50, a rendering apparatus 60, a viewpoint input apparatus 70, and a display apparatus 80. In the following, the N image capturing systems 10a to 10n will not be distinguished unless otherwise specified and will be described as the image capturing systems 10. There may be any number of image capturing systems 10 as long as there are two or more image capturing systems 10.

The N image capturing systems 10a to 10n include image capturing apparatuses 11a to 11n, respectively, and image processing apparatuses 12a to 12n, respectively. In the following, the image capturing apparatuses 11a to 11n and the image processing apparatuses 12a to 12n will not be distinguished unless otherwise specified and will be described as the image capturing apparatuses 11 and the image processing apparatuses 12. The image capturing apparatuses 11 receive a command from the control apparatus 30 via the switching hub 20 and perform image capturing according to the command. The image processing apparatuses 12 extract an intra-region image of an object from an image obtained by image capturing and transmit the extracted image to the modeling apparatus 40 via the switching hub 20. Here, the image capturing systems 10a to 10n perform image capturing in synchronization. The operation of the image capturing systems 10a to 10n can be synchronized such that a shift does not occur in an image capturing time. The image capturing systems 10 are arranged so as to capture an image of an object to be included in a virtual viewpoint video from a plurality of directions. The image capturing apparatuses 11 and the image processing apparatuses 12 may be, for example, camera processors and cameras. The object is not limited to a foreground object and may be a background.

The modeling apparatus 40 estimates a three-dimensional shape of the object based on information transmitted from the image capturing systems 10 and writes a three-dimensional model indicating the three-dimensional shape of the object in the database 50. The modeling apparatus 40 can estimate the three-dimensional shape of the object using the captured images obtained by the image capturing systems 10. A visual hull method described in Matusik, for example, can be used as an estimation method. Further, the modeling apparatus 40 can further write the information necessary for generating a virtual viewpoint video in the database 50. The information necessary for virtual viewpoint video generation includes, for example, a texture image for representing an appearance of a model, a position and orientation of an image capturing apparatus that captured the texture image, a parameter indicating a focal length, an image capturing time, and the like. An image captured by the image capturing system 10 can be used as the texture image.

The rendering apparatus 60 is an information processing apparatus according to an embodiment of the present disclosure and generates a virtual viewpoint video, which includes an object from a virtual viewpoint, based on captured images obtained by capturing an image of the object from a plurality of positions. The rendering apparatus 60 can obtain, from the viewpoint input apparatus 70, virtual viewpoint information designating a virtual viewpoint. The designation of the virtual viewpoint may include time-related information. For example, the time-related information may be an image capturing time of a rendering target for each frame (hereinafter, referred to as the rendering time). That is, it is possible to designate the image capturing time of a rendering target for each frame of the virtual viewpoint video. In this case, it is possible to use an image captured at the designated image capturing time to generate a virtual viewpoint video, which includes an object at that image capturing time. A virtual viewpoint video generated by such a configuration may include a segment in which an object is stationary because the object of the same time appears over a plurality of frames.

Further, the time-related information may be information indicating a position of a virtual viewpoint for each frame. That is, it is possible to move the virtual viewpoint; in other words, it is possible to set a different virtual viewpoint for each frame of a virtual viewpoint video. The designation of a virtual viewpoint may be provided as a camera path indicating the movement of a camera, which corresponds to the virtual viewpoint, over time. The rendering apparatus 60 reads necessary information from the database 50 based on the received viewpoint and generates a virtual viewpoint video by performing rendering processing. The virtual viewpoint video obtained by the rendering processing is transmitted to the display apparatus 80.

The viewpoint input apparatus 70 may be an input apparatus, such as a keyboard or mouse, for example. The display apparatus 80 may be, for example, a display. In FIG. 1, the modeling apparatus 40, the rendering apparatus 60, the viewpoint input apparatus 70, and the display apparatus 80 are illustrated as separate apparatuses. Meanwhile, two or more of these apparatuses may be integrated into one apparatus. For example, the rendering apparatus 60 may also serve the functions of the viewpoint input apparatus 70 or the display apparatus 80. As an example, the rendering apparatus 60 may be a tablet computer having a touch panel display, and such a rendering apparatus 60 may also operate as the viewpoint input apparatus 70 and the display apparatus 80. For example, a virtual viewpoint video may be displayed on the display of the tablet computer, and the user may manipulate the position and orientation of the virtual viewpoint by touching the display. In this case, the tablet computer can generate a virtual viewpoint video by a CPU, a RAM, a ROM and a communication unit to be described later cooperating. The rendering apparatus 60 may also include the functions of the modeling apparatus 40, and in this case, the rendering apparatus 60 can generate a three-dimensional model of an object.

Figure 2:
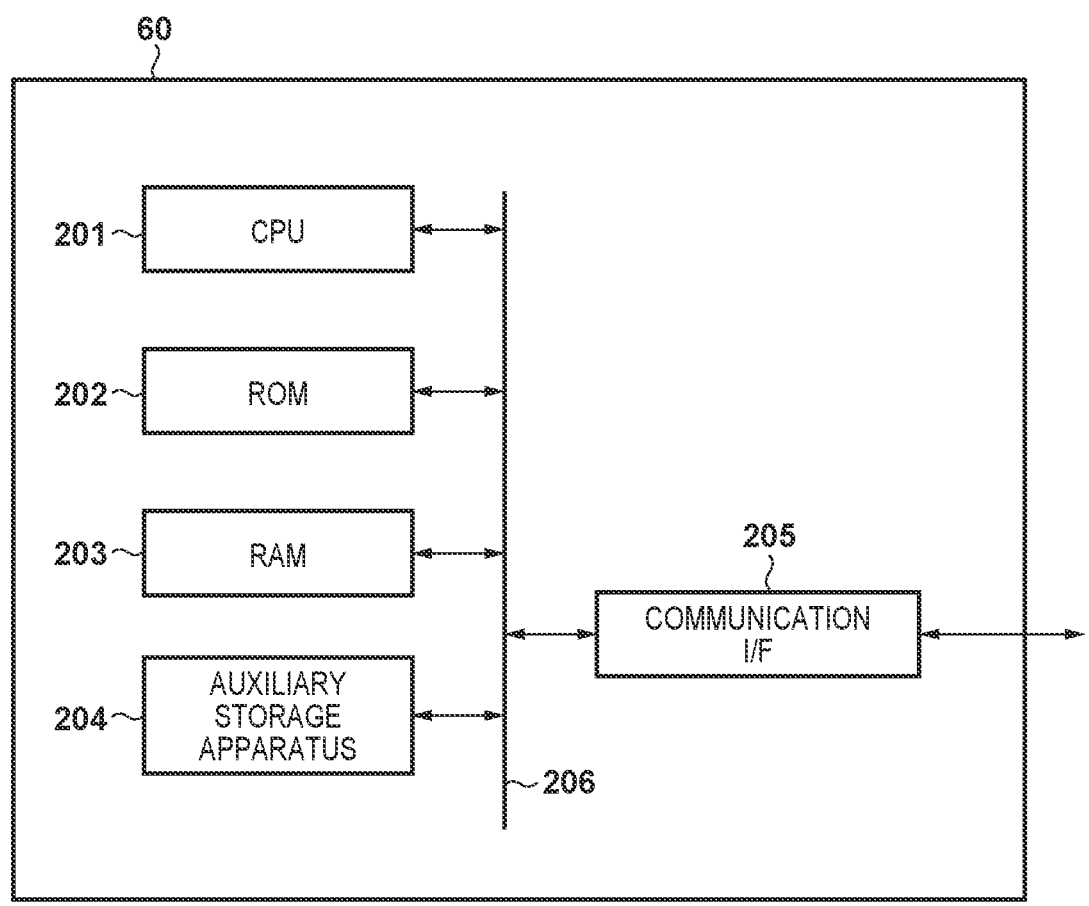
FIG. 2 is a diagram illustrating an example of a hardware configuration of a rendering apparatus according to an embodiment.

FIG. 2 is a diagram illustrating an example of a hardware configuration of the rendering apparatus 60 of the present embodiment. The rendering apparatus 60 includes a CPU 201, a ROM 202, a RAM 203, an auxiliary storage apparatus 204, a communication I/F 205, and a bus 206. The modeling apparatus 40 can be realized using the same hardware. Further, the rendering apparatus 60 may be configured by a plurality of information processing apparatuses that are connected via a network, for example.

Figure 3:
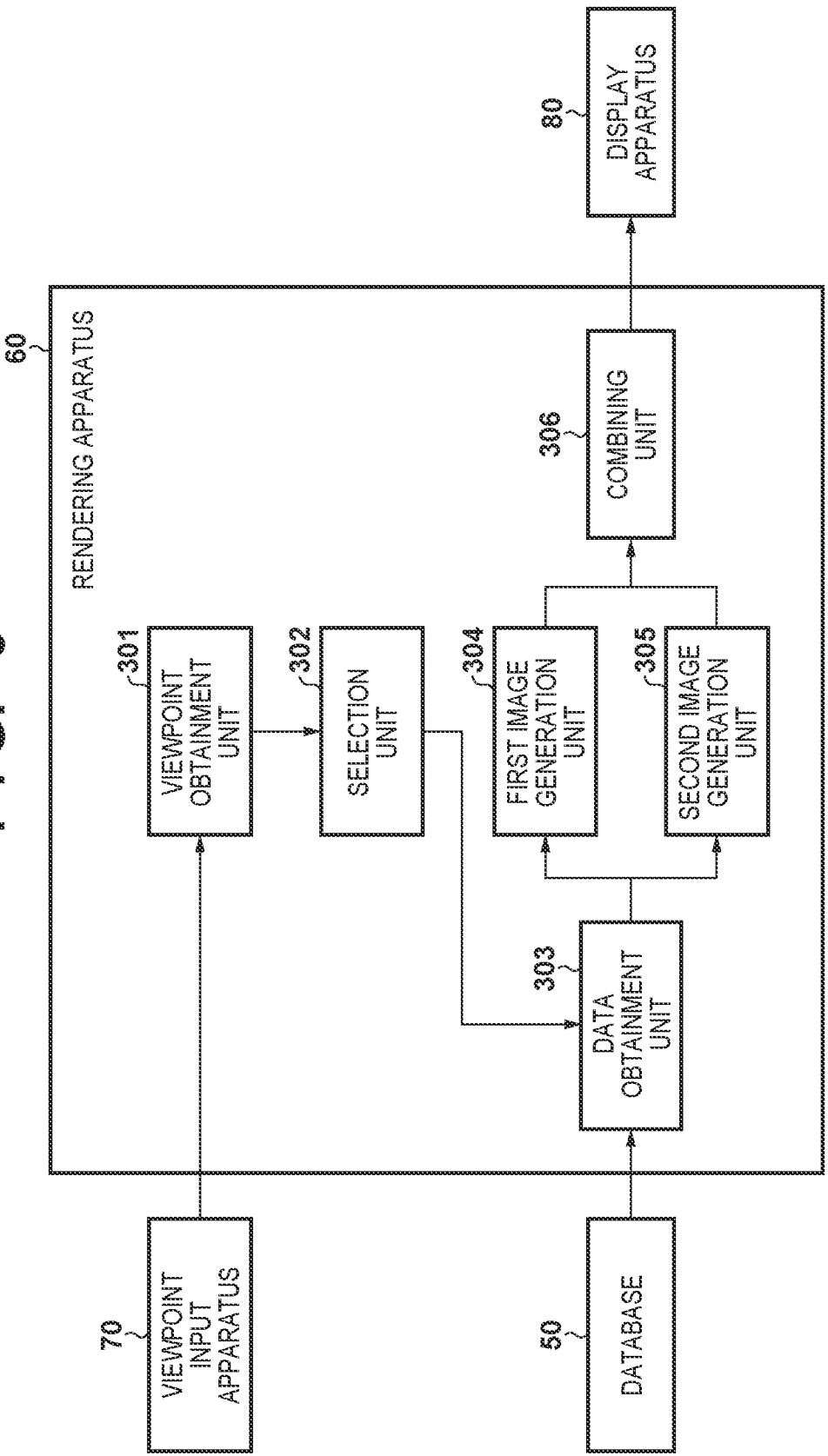
FIG. 3 is a diagram illustrating an example of a functional configuration of the rendering apparatus according to an embodiment.

The CPU 201 realizes the functions of the respective processing units included in the rendering apparatus 60 illustrated in FIG. 3 by controlling the entire rendering apparatus 60 using a computer program or data stored in the ROM 202 or the RAM 203. The rendering apparatus 60 may have one or more pieces of dedicated hardware that are different from the CPU 201, and in this case, at least a portion of the processing by the CPU 201 can be performed by the dedicated hardware. Examples of the dedicated hardware include an application-specific integrated circuit (ASIC), a field-programmable gate array (FPGA), digital signal processor (DSP), and the like.

The ROM 202 is a memory for storing programs that do not need to be changed and the like. The RAM 203 is a memory for temporarily storing programs or data supplied from the auxiliary storage apparatus 204, data supplied externally via the communication I/F 205, and the like. The auxiliary storage apparatus 204 is configured by a storage, such as a hard disk drive, for example, and stores various kinds of data, such as image data or audio data. The communication I/F 205 is used for communicating with apparatuses that are external to the rendering apparatus 60. For example, if the rendering apparatus 60 is connected to an external apparatus by a cable, a cable for communication is connected to the communication I/F 205. If the rendering apparatus 60 is to communicate wirelessly with an external apparatus, the communication I/F 205 comprises an antenna. The bus 206 connects the respective units of the rendering apparatus 60 to transmit information.

FIG. 3 is a diagram illustrating an example of a functional configuration related to the rendering processing of the rendering apparatus 60. The rendering apparatus 60 includes a selection unit 302, a first image generation unit 304, and a second image generation unit 305. Further, the rendering apparatus 60 may include a viewpoint obtainment unit 301, a data obtainment unit 303, and a combining unit 306.

The viewpoint obtainment unit 301 obtains the virtual viewpoint information from the viewpoint input apparatus 70. As described above, the virtual viewpoint information may include time information. The virtual viewpoint information may include an external parameter indicating the position and posture of the virtual viewpoint, and an internal parameter indicating the focal length of the virtual viewpoint and the like. The virtual viewpoint information may also include a rendering time for each object.

The selection unit 302 selects a method of determining a color of an object in the virtual viewpoint video based on the movement of the virtual viewpoint corresponding to the virtual viewpoint video, which includes the object, generated based on the captured images obtained by capturing images of the object or based on the movement of the object. For example, the selection unit 302 selects a rendering method based on the movement amount of the virtual viewpoint or the object between frames. Here, when the movement amount of the virtual viewpoint or the movement amount of the object between frames exceeds a threshold, the selection unit 302 may select a first determination method for a color (a first rendering method), and when the movement amounts are less than or equal to the threshold, the selection unit 302 may select a second determination method for a color (a second rendering method). Here, virtual-viewpoint-dependent rendering to be described later can be performed as the first rendering method, and virtual-viewpoint-independent rendering to be described later can be performed as the second rendering method.

In the present embodiment, the selection unit 302 selects the rendering method according to whether the image capturing time of the object captured in the virtual viewpoint video changes between frames. Specifically, when the time of the object is stopped, the virtual-viewpoint-independent rendering is performed, and otherwise, the virtual-viewpoint-dependent rendering is performed. In the following example, if the rendering timing has changed, the selection unit 302 selects the first image generation unit 304, and if the rendering timing has not changed, the selection unit 302 selects the second image generation unit 305. The selection unit 302 can select a rendering method for each object. That is, the virtual viewpoint video may include a plurality of objects, and the selection unit 302 can select a rendering method for each of the plurality of objects. Here, each of the plurality of objects may be an independent object, such as a person or a vehicle or may be a portion of an object, such as a person's head or hand.

The data obtainment unit 303 obtains a three-dimensional model of an object and captured images. The data obtainment unit 303 in the present embodiment can obtain, from the database 50, data to be used by the image generation unit to be selected by the selection unit 302 and pass the data to the selected image generation unit. The data to be used by the image generation unit includes a three-dimensional model of an object (information indicating a three-dimensional shape), images captured at a plurality of viewpoints, an external/internal parameter for each image capturing apparatus, and the like.

The first image generation unit 304 and the second image generation unit 305 generate a virtual viewpoint video, which includes an object. The virtual viewpoint video can be rendered based on a three-dimensional model and captured images as outlined below. That is, it is possible to identify a component (e.g., a point or a polygon) of a three-dimensional model that is captured in each pixel in a virtual viewpoint video according to a parameter, such as the position and posture of a virtual viewpoint. Further, a pixel in a captured image in which a component is captured by an image capturing apparatus can be identified according to a parameter, such as the position and orientation of the image capturing apparatus. Thus, a color of a component and a color of a pixel in which the component is captured in a virtual viewpoint video can be determined based on a color of a pixel in which the component is captured in a captured image. Here, a captured image to be used when determining a color of each pixel of a virtual viewpoint video (or an image capturing apparatus that has captured that image) can be selected from among captured images (or image capturing apparatuses 11). In an embodiment, a method for selecting a captured image (or an image capturing apparatus) is different between the first image generation unit 304 and the second image generation unit 305.

Here, the first image generation unit 304 and the second image generation unit 305 determine a color of an object in a virtual viewpoint video based on a captured image by the rendering method that has been selected by the selection unit 302. In the present embodiment, the image generation unit, which has been selected by the selection unit 302, generates a virtual viewpoint image based on the virtual viewpoint information that has been obtained by the viewpoint obtainment unit 301 and the data that has been obtained by the data obtainment unit 303 by the respective rendering method that has been set.

The first image generation unit 304 determines a color of an object in a virtual viewpoint video using the first rendering method in which a color of an object of a virtual viewpoint video is determined according to a position of the virtual viewpoint, and generates a virtual viewpoint video. For example, the first image generation unit 304 can select a captured image to be used for determining a color of an object in a virtual viewpoint video according to a position of the virtual viewpoint. According to this method, since color information of an object is determined depending on a position and orientation of the virtual viewpoint, the color of the object changes when the virtual viewpoint moves. Such a rendering method is referred to in the present specification as virtual-viewpoint-dependent rendering. A color of an object in a virtual viewpoint video can also be determined by weighted-combination of colors of an object in respective captured images captured by the plurality of image capturing apparatuses. Changing the combination of the image capturing apparatuses or the captured images to be used in this case and changing the weight of the weighted-combination to be used in this case are also included in the selection of the image capturing apparatus or the captured image in the present specification.

In virtual-viewpoint-dependent rendering, one or more image capturing apparatuses are selected so that the direction in which the object is observed from the virtual viewpoint and the direction in which the object is observed from the image capturing apparatus are close to each other. For example, an image captured by the image capturing apparatus for which the line-of-sight direction from the image capturing apparatus to the object is closer to the line-of-sight direction from the virtual viewpoint to the object among the plurality of image capturing apparatuses that capture an image, is selected to determine the color of the object in the virtual viewpoint video. Then, based on the image captured by the image capturing apparatus thus selected, the color of the object is determined. Thus, since it is expected that the appearance of the object from the selected image capturing apparatus will be close to the appearance of the object from the virtual viewpoint, it is possible to generate a high-definition virtual viewpoint video according to the virtual-viewpoint-dependent rendering. Meanwhile, there is a possibility that when the image capturing apparatus to be selected is switched the change in the color of the object in the virtual viewpoint video may be noticeable.

The second image generation unit 305 determines a color of an object in a virtual viewpoint video using the second rendering method in which a color of an object of a virtual viewpoint video is determined regardless of a position of the virtual viewpoint, and generates a virtual viewpoint video. For example, the second image generation unit 305 can select a captured image to be used for determining a color of an object in a virtual viewpoint video regardless of a position of the virtual viewpoint. According to this method, since color information of an object is determined independently of a position and orientation of the virtual viewpoint, the color of the object does not change when the virtual viewpoint moves. Such a rendering method is referred to in the present specification as virtual-viewpoint-independent rendering.

Examples of a method of virtual-viewpoint-independent rendering include, for example, a method in which a normal is determined for each small region of a three-dimensional model of an object and a color of each small region of the object is determined based on an image captured by the image capturing apparatus that is the closest to the respective normal. Then, a virtual viewpoint video can be generated based on the thus determined color of each small region of the object. Further, the second image generation unit 305 may add color information to the three-dimensional model by such a method in which the three-dimensional model and the captured images are used. Then, the second image generation unit 305 can determine a color of an object in a virtual viewpoint video using the color information added to the three-dimensional model. The second image generation unit 305 may thus perform coloring of a three-dimensional model of an object, and generate a virtual viewpoint video by rendering the colored three-dimensional model.

In addition, it is not necessary that the rendering apparatus 60 performs coloring on the three-dimensional model. Since a color of the three-dimensional model is independent of the virtual viewpoint in this example, the modeling apparatus 40 can perform coloring for the three-dimensional model and write the color information to the database 50. In this case, the second image generation unit 305 can generate a virtual viewpoint image based on the color information of the three-dimensional model that has been written in the database 50 by the modeling apparatus 40.

As described above, in virtual-viewpoint-dependent rendering, it is possible to select an image capturing apparatus, which is to be used for determining a color, from a plurality of image capturing apparatuses according to a position and orientation of the virtual viewpoint. Meanwhile, in virtual-viewpoint-independent rendering, it is possible to select an image capturing apparatus, which is to be used for determining a color, from a plurality of image capturing apparatuses irrelevant to the position and orientation of the virtual viewpoint. As a result, in virtual-viewpoint-dependent rendering, a color of the same object of a virtual viewpoint video (e.g., an object of the same shape at the same rendering time) varies between frames according to the position of the virtual viewpoint. Meanwhile, in virtual-viewpoint-independent rendering, a color of the same object in the virtual viewpoint video is constant between frames regardless of the position of the virtual viewpoint.

As described above, the selection unit 302 selects the image generation unit for each object, and rendering of each object is performed by the first image generation unit 304 or the second image generation unit 305 for each object. The combining unit 306 combines the rendering results obtained by the plurality of rendering methods. For example, the combining unit 306 can generate a virtual viewpoint video including a plurality of objects by combining virtual viewpoint videos, each of which has been generated for each object. Further, the combining unit 306 transmits the obtained virtual viewpoint video to the display apparatus 80.

Figure 4:
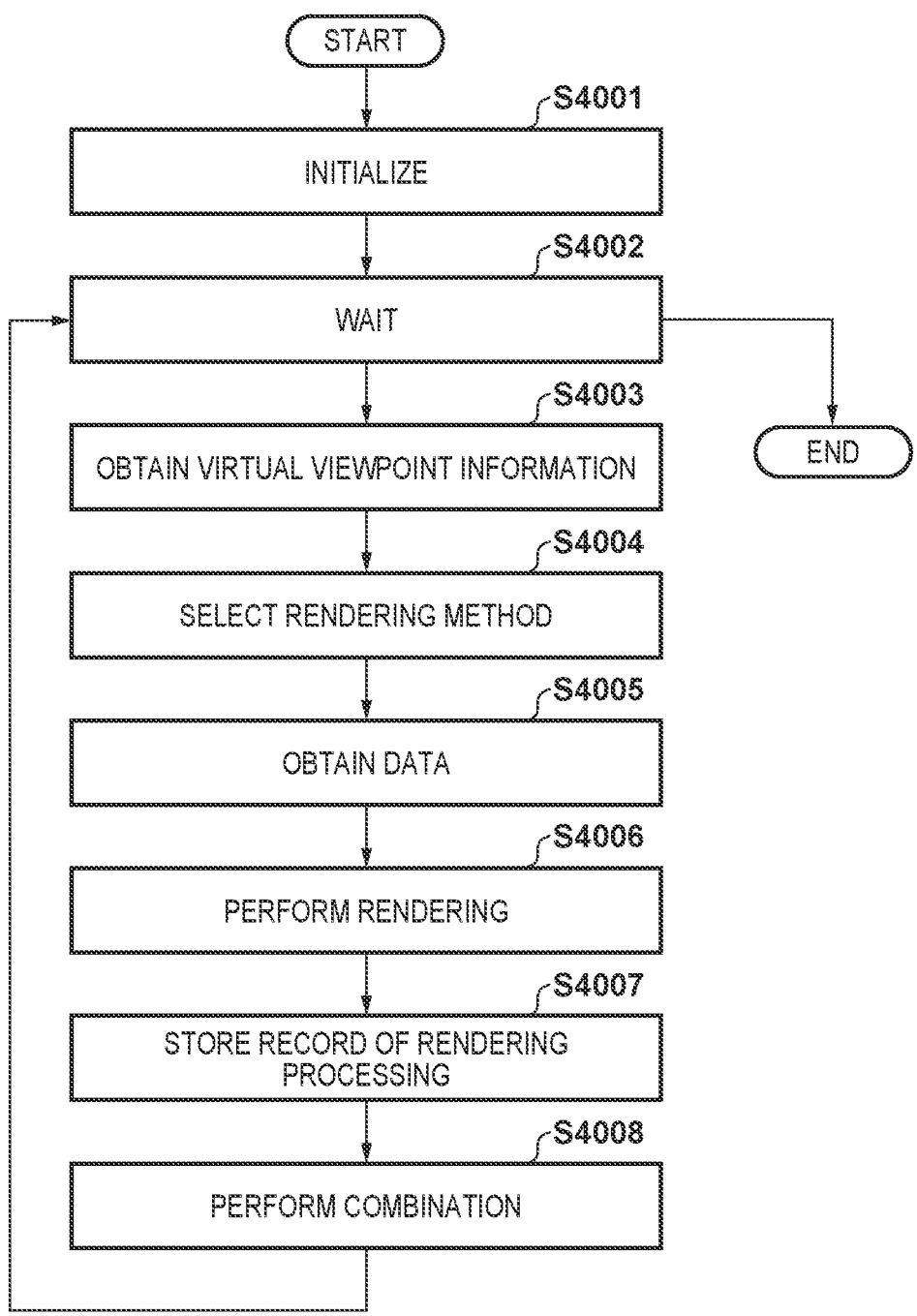
FIG. 4 is a diagram illustrating a processing flow of an information processing method according to an embodiment.

FIG. 4 is a flowchart for explaining a flow of processing for generating a virtual viewpoint video according to the present embodiment. The flowchart indicated in FIG. 4 can be realized by a control program stored in the ROM 202 being read out to the RAM 203 and being executed by the CPU 201.

In step S4001, the rendering apparatus 60 is initialized. Here, the parameters to be used by each unit can be set.

In step S4002, the viewpoint obtainment unit 301 enters a standby state for receiving input from the viewpoint input apparatus 70. The viewpoint obtainment unit 301 may receive information from the viewpoint input apparatus 70 via a network or may read a file. If the virtual viewpoint information is not received or an end command is received, the processing ends.

In step S4003, the viewpoint obtainment unit 301 obtains the virtual viewpoint information from the viewpoint input apparatus 70. As described above, the virtual viewpoint information may include rendering time information, but there are no particular limitations to the format of the rendering time. For example, the rendering timing can be identified by time or a frame ID. The frame ID may be information for identifying the frame, which was captured at the rendering time, in a video that has been captured by the image capturing systems 10. Here, each time the viewpoint obtainment unit 301 obtains the virtual viewpoint information from the viewpoint input apparatus 70, one frame of a virtual viewpoint video may be generated according to steps S4004 to S4008. Further, temporal virtual viewpoint information in each frame may be inputted to the viewpoint input apparatus 70. In this case, a virtual viewpoint video configured by a plurality of frames can be generated by repeating obtainment of virtual viewpoint information in each frame and generation of each frame based on the virtual viewpoint information in steps S4002 to S4008. Hereinafter, a frame to be generated by a single process of steps S4004 to S4008 is referred to as a frame that is currently being generated (or a current frame).

In step S4004, the selection unit 302 selects the rendering method according to the virtual viewpoint information received in step S4003. In the present embodiment, the selection unit 302 selects the rendering method based on the rendering time information. As described above, when rendering a plurality of objects, the selection processing can be performed for each object. Specifically, when the rendering time of the object in the current frame is different from the rendering time of the object in the frame that is immediately preceding the current frame (simply referred to as the preceding frame), the selection unit 302 can select the first image generation unit 304. In addition, when the rendering time of the object in the current frame is the same as the rendering time of the object in the preceding frame, the selection unit 302 can select the second image generation unit 305. The selection unit 302 may select the rendering method based on the rendering time of the object in the current frame and the rendering time of the object in the frame that is immediately after the current frame (simply referred to as the next frame). In this case, the processing may wait until two frames worth of virtual viewpoint information are obtained.

In step S4005, the data obtainment unit 303 obtains data to be used by the image generation unit, which has been selected in step S4004, from the database 50. The data to be obtained will be described later.

In step S4006, the first image generation unit 304 or the second image generation unit 305, which has been selected in step S4004, performs rendering in accordance with the method which has been selected in step S4004, using the data which has been obtained in step S4005. The first image generation unit 304 obtains from the data obtainment unit 303 a three-dimensional model of the object, a captured image from each image capturing apparatus, and external and internal parameters for each image capturing apparatus. Then, the first image generation unit 304 generates a virtual viewpoint image of the object in the current frame by performing virtual-viewpoint-dependent rendering using the virtual viewpoint information, which has been obtained in step S4003, in addition to these pieces of information.

Meanwhile, the second image generation unit 305 obtains the three-dimensional model of the object and the color information thereof from the data obtainment unit 303 and generates a virtual viewpoint image of the object by performing virtual-viewpoint-independent rendering based on the virtual viewpoint information, which has been obtained in step S4003. When there is no color information of the three-dimensional model in the database 50, the second image generation unit 305 obtains a captured image from each image capturing apparatus and the external and internal parameters for each image capturing apparatus. Then, the second image generation unit 305 can generate a virtual viewpoint image of the object by performing virtual-viewpoint-independent rendering using the virtual viewpoint information, which has been obtained in step S4003, in addition to these pieces of information. At this time, the second image generation unit 305 may perform coloring for the three-dimensional model as previously described. Here, the second image generation unit 305 can add color information to a portion which appears in a virtual viewpoint video in the current frame and is of the three-dimensional model, and need not add color information to a portion which does not appear in the virtual viewpoint video in the current frame.

In step S4007, the selection unit 302 stores a record of the rendering processing by the first image generation unit 304 or the second image generation unit 305. In the present embodiment, the selection unit 302 records the rendering time of each object. This record can be used to select a rendering method in the next frame. In addition, if the second image generation unit 305 has performed coloring for the three-dimensional model in step S4006, the selection unit 302 can store the color information indicating the result of coloring for the three-dimensional model as a record of the rendering processing. In this case, when generating the next frame, the second image generation unit 305 may render the next frame using the color information of the three-dimensional model recorded at the time of the rendering processing of the past frame. When a component of the three-dimensional model that appears in the current frame is not colored, the second image generation unit 305 can determine the color information of the component by virtual-viewpoint-independent rendering as described above. That is, the second image generation unit 305 can use the color information to determine the color of the object for a portion to which color information has already been added among portions that appear in a virtual viewpoint video of a three-dimensional model. Meanwhile, the second image generation unit 305 can determine the color of the object based on a captured image for a portion to which the color information is not added. The selection unit 302 can write this record to the ROM 202, the RAM 203, the auxiliary storage apparatus 204, or the database 50.

In step S4008, the combining unit 306 generates the current frame of the virtual viewpoint video by combining the virtual viewpoint images of the object generated by the first image generation unit 304 or the second image generation unit 305. Then, the combining unit 306 transmits the obtained frame to the display apparatus 80. In a case where combination is unnecessary, such as when there is one object that is a target of rendering, the combining unit 306 can transmit to the display apparatus 80 the virtual viewpoint image generated by the first image generation unit 304 or the second image generation unit 305, without performing the combination processing. Thereafter, the processing returns to step S4002, and the next frame can be generated.

According to the above embodiment, the rendering method is selected based on the amount of movement of the object, and more specifically, the rendering method is selected in accordance with whether the rendering time of the object to be rendered is stopped. When the object is still because the rendering time does not change, if virtual-viewpoint-dependent rendering is used, the change in the color of the object due to the switching of the image capturing apparatus that is used for determining the color of the object may be noticeable. However, in the above-described embodiment, since the virtual-viewpoint-independent rendering is used in such a case, such a change in color can be suppressed. Meanwhile, when the rendering time changes, virtual-viewpoint-dependent rendering can be performed to generate high-definition virtual viewpoint videos.

As previously described, in step S4006, the second image generation unit 305 may render the current frame using the color information of the three-dimensional model, which has been recorded at the time of rendering processing of the past frame. When a component of the three-dimensional model that appears in the current frame is not colored, the second image generation unit 305 may determine the color information of the component by virtual-viewpoint-dependent rendering. In other words, the rendering method can be determined depending on whether or not the color has been determined in the past frame. In other words, for a portion for which the color has been determined in the past frame, the rendering method in which that result is used can be used. Meanwhile, the rendering method (e.g., a virtual-viewpoint-dependent rendering method) that is based on the captured image can be used for a portion where the color has not been determined in the past frame. Even by such a method, since the color of the portion that appears on the preceding frame of the object is maintained even in the current frame, it is possible to suppress the change in the color of the object.

Figure 5:
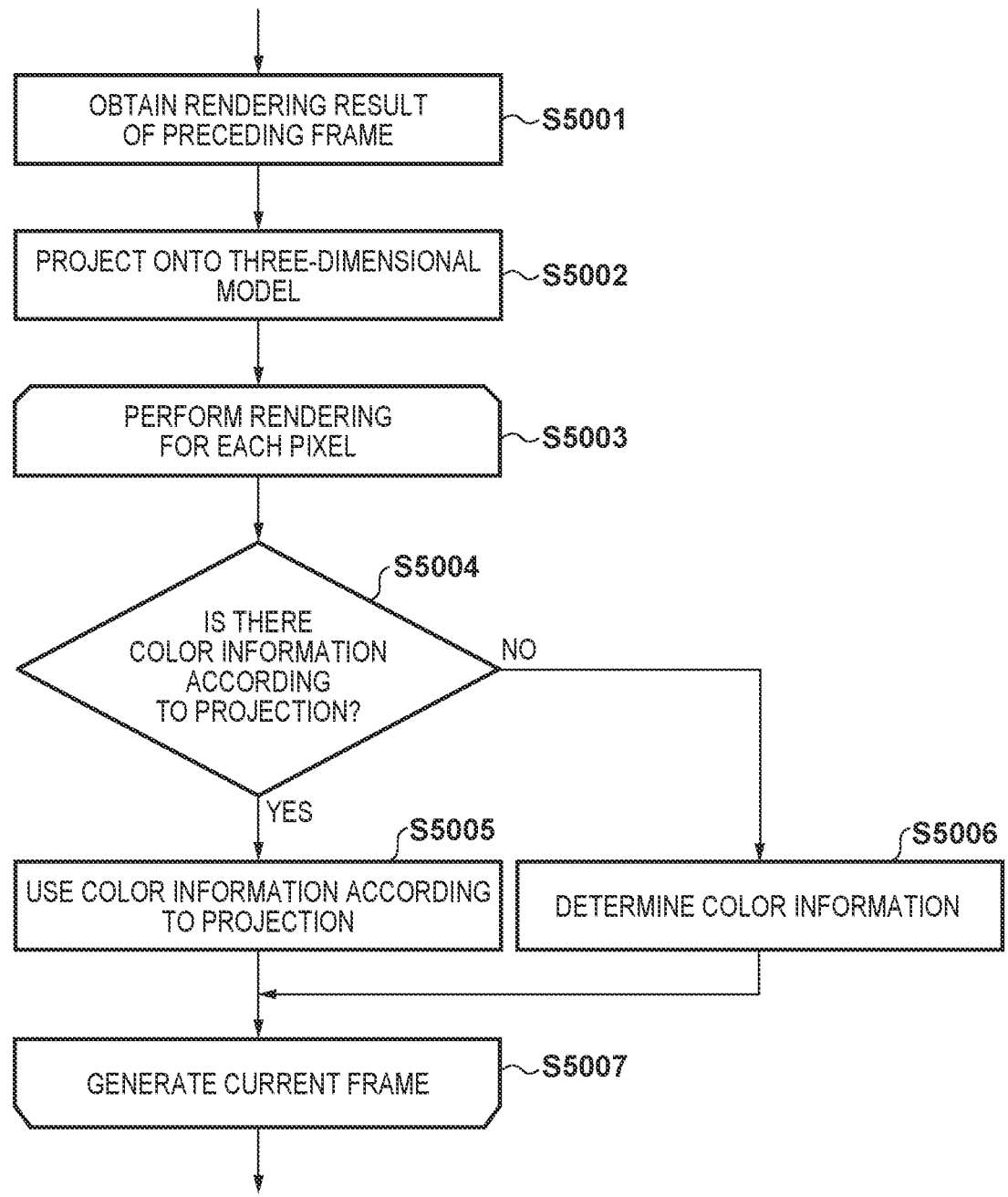
FIG. 5 is a diagram illustrating a processing flow of a rendering method according to an embodiment.

Further, the second image generation unit 305 may render the current frame by determining the color of the object in the virtual viewpoint video based on the rendering result of the past frame (for example, the preceding frame). Such a processing method will be described with reference to FIG. 5. The processing method indicated in FIG. 5 can be performed by the second image generation unit 305 in step S4006. In step S5001, the second image generation unit 305 obtains the rendering result of the preceding frame. In step S5002, the second image generation unit 305 projects the rendering result of the obtained preceding frame onto a three-dimensional model 601 in the current frame to generate color information of the three-dimensional model 601. That is, the second image generation unit 305 adds color information of a visible portion 602 (a solid line portion) by projecting the rendering result from a virtual viewpoint 611 in the preceding frame.

Figure 6:
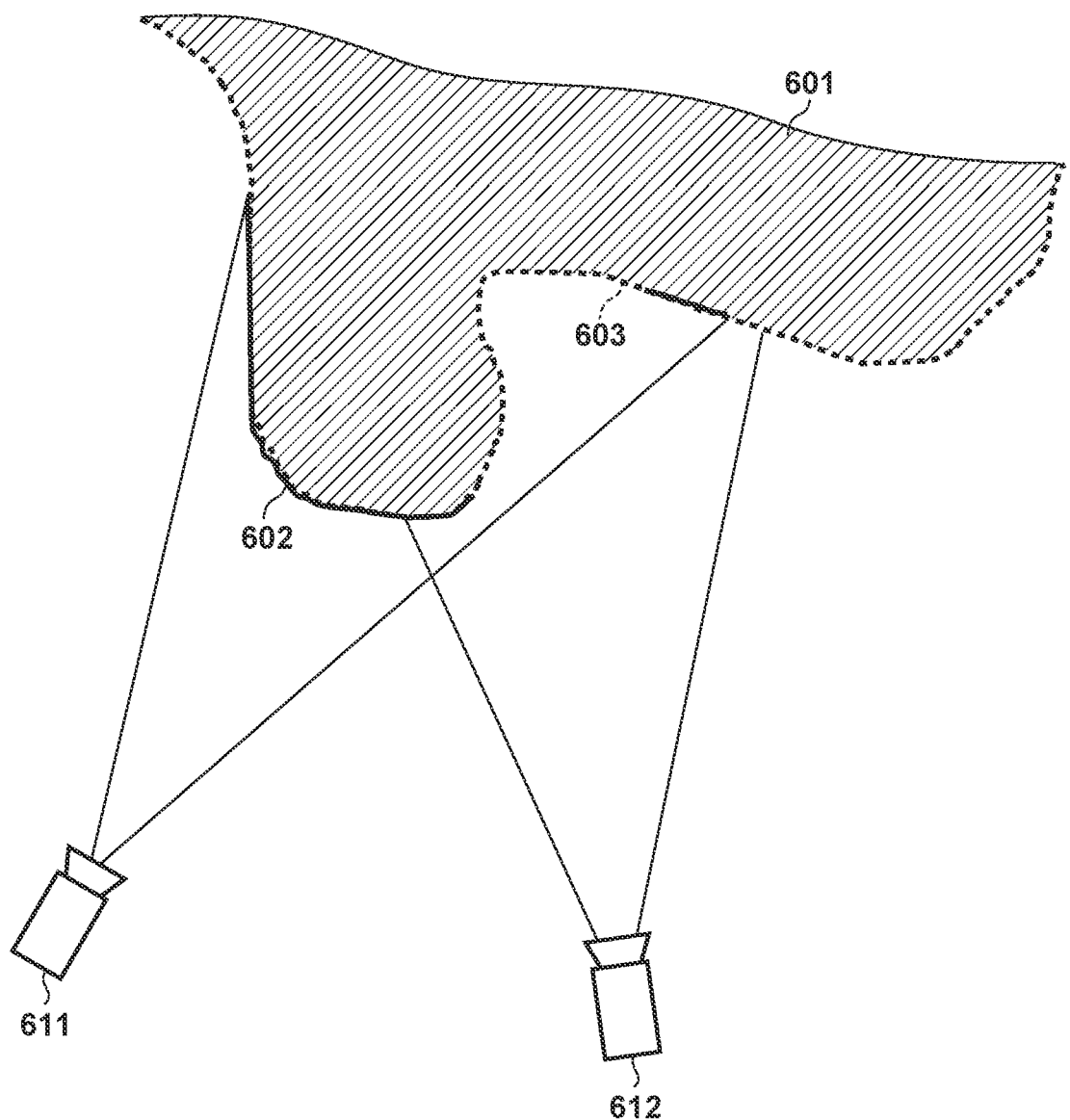
FIG. 6 is a diagram for explaining projection of a rendering result onto a three-dimensional model.

A loop of steps S5003 to S5007 is performed for each pixel of the virtual viewpoint image from a virtual viewpoint 612 of the current frame. In step S5004, the second image generation unit 305 determines whether there is a component of the three-dimensional model having the color information, which has been added by projecting the rendering result of the preceding frame in step S5002 over the light rays from the virtual viewpoint 612 corresponding to the pixel to be processed. If there is such a component (visible portion 602 in FIG. 6), the processing proceeds to step S5005, if not (a dotted line portion 603 in FIG. 6), the processing transitions to step S5006.

In step S5005, the second image generation unit 305 uses the color information added in step S5002 as the color information of the processing target pixel of the current frame. In step S5006, since there is no color information of the processing target pixel, the second image generation unit 305 determines the color information of the processing target pixel in accordance with the virtual-viewpoint-dependent rendering method similarly to the first image generation unit 304. By repeating the loop of steps S5003 to S5007, the current frame of the virtual viewpoint video is generated.

As described above, since the color of the portion appearing in the preceding frame of the object is maintained in the current frame also by the second image generation unit 305 adding color information based on the rendering result in the preceding frame, the change in the color of the object can be suppressed.

Meanwhile, the method of selecting the rendering method based on the movement amount of the object is not limited to the above method. For example, the selection unit 302 may select the rendering method in accordance with the movement amount or the shape change amount between frames of the object appearing in the virtual viewpoint video. Specifically, the rendering method can be selected in accordance with the movement speed or the speed of change of the object. That is, even when the object is not moving or moving slowly, if virtual-viewpoint-dependent rendering is used, the change in the color of the object may be noticeable. Therefore, the selection unit 302 may select the viewpoint-dependent rendering by the first image generation unit 304 in accordance with the speed of movement of the object or the movement of other things, such as when the speed is faster than a threshold. Further, when the speed is less than or equal to the threshold, the selection unit 302 can select viewpoint-independent rendering by the second image generation unit 305. Meanwhile, the selection unit 302 may select the viewpoint-dependent rendering by the first image generation unit 304 in accordance with the shape change of the object between frames, such as when the amount of change is greater than a threshold. Further, when the amount of change is less than or equal to the threshold, the selection unit 302 can select viewpoint-independent rendering by the second image generation unit 305.

As a specific example, the selection unit 302 may determine the change in the object between the preceding frame and the current frame and if there is a change that is greater than or equal to a constant, the selection unit 302 may select viewpoint-dependent rendering by the first image generation unit 304. As for the method of estimating the amount of change, the amount of change may be calculated by tracking the shape of the object. As another method, an optical flow of the object may be calculated in an image captured by one or more image capturing apparatuses, and the length of the optical flow may be used as the amount of change. In this case, instead of selecting the same rendering method for one object, the rendering method may be selected for each region of the object.

As yet another example, the selection unit 302 may select the rendering method based on the amount of movement of the virtual viewpoint between frames. For example, the selection unit 302 may select the rendering method in accordance with the amount of movement of the virtual viewpoint between frames. That is, the faster the movement speed of the virtual viewpoint, the larger the change in the virtual viewpoint video, and therefore, it is considered that the change in the color of the object is less noticeable. For example, when the virtual viewpoint is moving at a high speed, it is considered that the change in the color of the object is less noticeable even if the object is still. Therefore, the selection unit 302 may select viewpoint-dependent rendering by the first image generation unit 304 in accordance with the speed of movement of the virtual viewpoint, such as when the speed is faster than a threshold. Further, when the speed is equal to or less than the threshold, the selection unit 302 can select the viewpoint-independent rendering by the second image generation unit 305. The movement speed of the virtual viewpoint can be determined based on the difference between the positions of the respective virtual viewpoints corresponding to two frames. The movement speed of the virtual viewpoint can also be determined based on the difference between the line-of-sight directions of the respective virtual viewpoints corresponding to two frames. Alternatively, the movement speed of the virtual viewpoint can also be determined based on those two parameters.

When thus selecting the rendering method in accordance with the amount of movement of the virtual viewpoint or the amount of movement of the object, in step S4006, the second image generation unit 305 may determine whether the shape of the object has changed from the preceding frame. If the shape of the object has not changed from the preceding frame, the second image generation unit 305 can perform rendering using a record of the previous rendering processing, such as the color information of the three-dimensional model of the object, which has been previously recorded in step S4007. Meanwhile, if the shape of the object has changed from the preceding frame, the second image generation unit 305 can redo the adding of color information to the three-dimensional model.

The selection of the rendering method that accords with the amount of movement of the object and the selection of the rendering method that accords with the amount of movement of the virtual viewpoint may be used in combination. For example, while selecting the rendering method in accordance with the amount of movement of the object as described above, in a case where the movement speed of the virtual viewpoint is greater than or equal to a constant, viewpoint-dependent rendering by the first image generation unit 304 may be selected regardless of the amount of movement of the object.

When the object includes a directional reflection region, if the virtual viewpoint video is generated by viewpoint-independent rendering, directional reflection is not reproduced even if the virtual viewpoint position changes, and thereby the reproducibility of the video decreases. The directional reflection region refers to a region in which uniform diffuse reflection does not occur and whose intensity of reflected light changes according to the reflection direction. Therefore, the selection unit 302 may select the rendering method further based on whether the object includes a directional reflection region. For example, for the object that includes a directional reflection region, the selection unit 302 can select the rendering method in which the color of the object in the virtual viewpoint video is determined in accordance with the position of the virtual viewpoint regardless of the amount of movement of the virtual viewpoint or the object. For example, the rendering method may be selected so as to perform viewpoint-dependent rendering for the directional reflection region in the object.

In such an embodiment, in step S4003, the data obtainment unit 303 obtains information indicating the directional reflection region from the database 50. The modeling apparatus 40 can register a region which is in the object and in which colors that are seen from respective image capturing apparatuses are different as a directional reflection region in the database. For example, the modeling apparatus 40 may add a flag to the component of the three-dimensional model indicating that the component belongs to a directional reflection region.

In step S4004, the selection unit 302 selects the image generation unit based on, in addition to the amount of movement of the virtual viewpoint or the object, the information indicating the directional reflection region obtained in step S4003. Specifically, when rendering the directional reflection region, the selection unit 302 may select viewpoint-dependent rendering in which the first image generation unit 304 is used, independently of the amount of movement of the virtual viewpoint or the object. Meanwhile, when rendering regions other than the directional reflection region, the selection unit 302 can select the rendering method in accordance with the amount of movement of the virtual viewpoint or the object as described above. According to such a configuration, it is possible to enhance reproducibility in virtual viewpoint video of an object which includes a directional reflection region.

The rendering method may be changed in accordance with the movement of the virtual viewpoint. For example, the rendering method may be changed between a case where the virtual viewpoint moves around the object with the object at the center and a case where that is not the case. More specifically, in a case where the virtual viewpoint moves around the object with the object at the center, the color of the object in the virtual viewpoint video may be determined by viewpoint-independent rendering. For example, in cases where the virtual viewpoint moves in a straight line, such as when the virtual viewpoint approaches the object from a certain direction or moves away from the object in a certain direction, the color of the object of the virtual viewpoint video may be determined by viewpoint-dependent rendering.

The rendering method may be changed in accordance with the movement of the object. The rendering method may be changed between a case where the object is moving in such a way that it spins and a case where that is not the case. Alternatively, the rendering method may be changed between a case where the object is still (i.e., there is no movement) and a case where the object is moving.

The rendering method may be changed in accordance with both the movement of the virtual viewpoint and the movement of the object. For example, the rendering method may be changed between a case where the virtual viewpoint is fixed and the object is moving and a case where the virtual viewpoint is moving but the object is still.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-013581, filed Jan. 31, 2022, which is hereby incorporated by reference herein in its entirety.

What is claimed is:

1. An information processing apparatus comprising one or more processors and one or more memories storing one or more programs which cause the one or more processors to:
select a determination method for determining a color of an object in a virtual viewpoint video, which includes the object and is generated based on a captured image obtained by capturing an image of the object, based on a movement of a virtual viewpoint corresponding to the virtual viewpoint video or a movement of the object, wherein the determination method is selected from:
   a first determination method in which a color of a same object in the virtual viewpoint video changes between frames in accordance with a position of the virtual viewpoint selected in response to a movement amount of the virtual viewpoint or a movement amount of the object between frames exceeding a threshold, and
   a second determination method in which the color of the same object in the virtual viewpoint video is constant between frames regardless of the position of the virtual viewpoint selected in response to the movement amount of the virtual viewpoint or the movement amount of the object between frames being less than or equal to the threshold; and
  generate the virtual viewpoint video, which includes the object, through determining the color of the object in the virtual viewpoint video with the selected determination method.

2. The information processing apparatus according to claim 1, wherein the one or more programs cause the one or more processor to:
  select the determination method from out of the first determination method in which a color of an object in the virtual viewpoint video is determined in accordance with a position of the virtual viewpoint and the second determination method in which the color of the object in the virtual viewpoint video is determined regardless of the position of the virtual viewpoint.

3. The information processing apparatus according to claim 1, wherein
  in the first determination method, a captured image to be used for determining a color of an object in the virtual viewpoint video is selected in accordance with the position of the virtual viewpoint, and in the second determination method, the captured image to be used for determining the color of the object in the virtual viewpoint video is selected regardless of the position of the virtual viewpoint.

4. The information processing apparatus according to claim 3, wherein
  in the first determination method, a captured image, which has been captured by an image capturing apparatus whose line-of-sight direction from the image capturing apparatus to the object is closer to a line-of-sight direction from the virtual viewpoint to the object among a plurality of image capturing apparatuses capturing the captured image, is used for determining the color of the object in the virtual viewpoint video.

5. The information processing apparatus according to claim 1, wherein
  in the second determination method, the color of the object in the virtual viewpoint video is determined using color information that has been added to a three-dimensional model of the object.

6. The information processing apparatus according to claim 5, wherein
  the color information is added to the three-dimensional model based on the three-dimensional model and the captured image.

7. The information processing apparatus according to claim 6, wherein
  the color information is added to a portion which is of the three-dimensional model and which appears in the virtual viewpoint video.

8. The information processing apparatus according to claim 5, wherein
  among portions which are of the three-dimensional model and which appear in the virtual viewpoint video, for a portion for which color information has already been added, the color of the object is determined using that color information, and for a portion for which color information has not been added, the color of the object is determined based on the captured image.

9. The information processing apparatus according to claim 1, wherein
  in the second determination method, the color of the object in the virtual viewpoint video is determined based on a rendering result of a past frame.

10. The information processing apparatus according to claim 1, wherein
  the determination method is selected in accordance with whether an image capturing time of the object appearing in the virtual viewpoint video changes between frames.

11. The information processing apparatus according to claim 1, wherein
  the determination method is selected in accordance with a movement amount or a shape change amount between frames of the object appearing in the virtual viewpoint video.

12. The information processing apparatus according to claim 1, wherein
  the determination method is selected in accordance with a movement amount between frames of the virtual viewpoint.

13. The information processing apparatus according to claim 1,
  wherein the virtual viewpoint video includes a plurality of objects, and
  wherein the one or more programs cause the one or more processor to select a determination method for each of the plurality of objects.

14. The information processing apparatus according to claim 13, wherein colors determined by a plurality of determination methods are combined.

15. The information processing apparatus according to claim 1, wherein
  the determination method is selected further based on whether the object includes a directional reflection region.

16. The information processing apparatus according to claim 15, wherein
  for the object including the directional reflection region, a determination method in which the color of the object in the virtual viewpoint video is determined in accordance with a position of the virtual viewpoint is selected regardless of a movement amount of the virtual viewpoint or the object.

17. An information processing method comprising:
  selecting a determination method for determining a color of an object in a virtual viewpoint video, which includes the object and is generated based on a captured image obtained by capturing an image of the object, based on a movement of a virtual viewpoint corresponding to the virtual viewpoint video or a movement of the object, wherein the determination method is selected from:
   a first determination method in which a color of a same object in the virtual viewpoint video changes between frames in accordance with a position of the virtual viewpoint selected in response to a movement amount of the virtual viewpoint or a movement amount of the object between frames exceeding a threshold, and a second determination method in which the color of the same object in the virtual viewpoint video is constant between frames regardless of the position of the virtual viewpoint selected in response to the movement amount of the virtual viewpoint or the movement amount of the object between frames being less than or equal to the threshold; and generating the virtual viewpoint video, which includes the object, through determining the color of the object in the virtual viewpoint video with the selected determination method.

18. A non-transitory computer-readable medium storing a program executable by a computer to perform a method comprising:

selecting a determination method for determining a color of an object in a virtual viewpoint video, which includes the object and is generated based on a captured image obtained by capturing an image of the object, based on a movement of a virtual viewpoint corresponding to the virtual viewpoint video or a movement of the object, wherein the determination method is selected from:

a first determination method in which a color of a same object in the virtual viewpoint video changes between frames in accordance with a position of the virtual viewpoint selected in response to a movement amount of the virtual viewpoint or a movement amount of the object between frames exceeding a threshold, and a second determination method in which the color of the same object in the virtual viewpoint video is constant between frames regardless of the position of the virtual viewpoint selected in response to the movement amount of the virtual viewpoint or the movement amount of the object between frames being less than or equal to the threshold; and generating the virtual viewpoint video, which includes the object, through determining the color of the object in the virtual viewpoint video with the selected determination method.

* * * * *